United States Patent
Yoshimoto et al.

(10) Patent No.: US 9,621,966 B2
(45) Date of Patent: Apr. 11, 2017

(54) MONITORING CONTROL SYSTEM AND CONTROL METHOD

(71) Applicants: KABUSHIKI KAISHA TOSHIBA, Minato-ku (JP); TOSHIBA SOLUTIONS CORPORATION, Kawasaki-shi (JP)

(72) Inventors: Takehiro Yoshimoto, Machida (JP); Nobuyuki Fukushima, Kawasaki (JP); Shinichi Fujita, Yokohama (JP); Masumi Inaba, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 0 days.

(21) Appl. No.: 14/901,234

(22) PCT Filed: Jun. 26, 2014

(86) PCT No.: PCT/JP2014/003419
§ 371 (c)(1),
(2) Date: Dec. 28, 2015

(87) PCT Pub. No.: WO2014/208092
PCT Pub. Date: Dec. 31, 2014

(65) Prior Publication Data
US 2016/0227299 A1    Aug. 4, 2016

(30) Foreign Application Priority Data

Jun. 28, 2013 (JP) ................................ 2013-137174

(51) Int. Cl.
*G06N 5/00* (2006.01)
*H04Q 9/02* (2006.01)
(Continued)

(52) U.S. Cl.
CPC ............... *H04Q 9/02* (2013.01); *G05B 15/02* (2013.01); *G06N 99/005* (2013.01); *G05B 23/0221* (2013.01); *G05B 2219/2642* (2013.01)

(58) Field of Classification Search
CPC ...... H04Q 9/02; G05B 12/02; G05B 23/0221; G05B 2219/2642; G06N 99/005
See application file for complete search history.

(56) References Cited

U.S. PATENT DOCUMENTS 6,208,266 B1 *  3/2001  Lyons ................... G01D 4/004
                                                340/870.01
7,539,549 B1 *  5/2009  Discenzo ............ F04D 15/0077
                                                324/765.01
(Continued)

FOREIGN PATENT DOCUMENTS

EP    2 128 592 A1    12/2009
JP    07-152789 A     6/1995
(Continued)

OTHER PUBLICATIONS

International Search Report issued on Sep. 22, 2014 for PCT/JP2014/003419 filed on Jun. 26, 2014.

*Primary Examiner* — Ted Wang
(74) *Attorney, Agent, or Firm* — Oblon, McClelland, Maier & Neustadt, L.L.P.

(57) ABSTRACT

A monitoring control system sequentially processing data collected from various data sources to find a possible phenomenon, producing an appropriate action for the found change or phenomenon, and outputting control information for causing a system to perform a notification or predetermined control. The monitoring control system includes a phenomenon detecting section configured to detect a phenomenon leading to a particular result from contiguous data received from data sources serving as data transmission element based on detecting rule definition data previously
(Continued)

specifying a change attribute of contiguous time-series data pieces for each phenomenon leading to a particular result, and a determination section configured to extract action information associated with the particular result detected by the phenomenon detecting section to produce an event for a predetermined system based on action definition data previously specifying action information for each particular result.

8 Claims, 9 Drawing Sheets

(51) Int. Cl.
    *G05B 15/02*      (2006.01)
    *G06N 99/00*      (2010.01)
    *G05B 23/02*      (2006.01)

(56) References Cited

U.S. PATENT DOCUMENTS

2011/0078141 A1*    3/2011    Fakeih .............. G06F 17/30536
                                                                                           707/736
2012/0041575 A1    2/2012    Maeda et al.

FOREIGN PATENT DOCUMENTS

JP          07-219622 A      8/1995
JP          2012-194806 A    10/2012

* cited by examiner

(FEEDBACK DATA)

| SYSTEM | STATUS | DANGER LEVEL | TRAFFIC AMOUNT | OPERATIONAL TIME | PARAMETER α | ACTION RESULT |
|---|---|---|---|---|---|---|
| CRM | MEMORY | INTERMEDIATE | .... | .... | .... | × |
| Web | CPU HIGH | HIGH | 2000 | .... | 0.7 | △ |
| EAM | CPU | HIGH | .... | .... | .... | × |
| Web | HARD DISK | LOW | .... | .... | .... | ○ |
| Web | CPU HIGH | INTERMEDIATE | 4000 | .... | 0.9 | ○ |
| Web | CPU HIGH | HIGH | 3000 | .... | 0.8 | △ |
| Web | CPU HIGH | INTERMEDIATE | 4000 | .... | 0.9 | ○ |

(STATISTICAL ANALYSIS LEARNING SECTION 341)

0.9 TENDS TO BE USED FAVORABLY AS PARAMETER α FOR DATA PIECE HAVING ATTRIBUTES OF SYSTEM "WEB" AND "CPU HIGH" AND ACTION RESULT "O"

FIG8

(FEEDBACK DATA)

| SYSTEM | STATUS | DANGER LEVEL | TRAFFIC AMOUNT | OPERATIONAL TIME | SUPPLEMENTARY INFORMATION | ACTION RESULT |
|---|---|---|---|---|---|---|
| CRM | MEMORY | INTERMEDIATE | .... | .... | STATUS | × |
| Web | CPU HIGH | HIGH | 2000 | Long | STATUS | △ |
| EAM | CPU | HIGH | .... | .... | OPERATIONAL TIME | × |
| Web | HARD DISK | HIGH | 3000 | Short | OPERATIONAL TIME | ○ |
| Web | CPU HIGH | INTERMEDIATE | .... | .... | TRAFFIC AMOUNT | ○ |

(SUPPLEMENTARY INFORMATION LEARNING SECTION 342)

OPERATIONAL TIME AS SUPPLEMENTARY INFORMATION TENDS TO BE USED FAVORABLY FOR DATA PIECE HAVING ATTRIBUTES OF SYSTEM "WEB" AND "CPU HIGH" AND ACTION RESULT "O"

FIG 9

CHANGE RATE OF POWER USE AMOUNT D=(P2-P1)/(t2-t1) × PARAMETER α

(DETECTING RULE DEFINITION FILE 311)

| DETECING PATTERN DEFINITION | PHENOMENON TO BE DETECTED |
|---|---|
| THRESHOLD VALUE < D | SUDDEN INCREASE IN TOTAL POWER USE AMOUNT |
| P > Q | TOTAL POWER USE AMOUNT P EXCEEDING MAXIMUM SUPPLY AMOUNT Q |

(ACTION DEFINITION FILE 331)

| DETECTED PHENOMENON | STATUS | DANGER LEVEL | ACTION | NOTIFICATION DESTINATION | SUPPLEMENTARY INFORMATION |
|---|---|---|---|---|---|
| SUDDEN INCREASE IN TOTAL POWER USE AMOUNT | LARGE USE AMOUNT | DANGER LEVEL: INTER-MEDIATE | ALERT | DR SYSTEM | CUSTOMER AT HOME AND HAVING PREDETERMINED CONCERTED EFFORT RANKING OR HIGHER |
| TOTAL POWER USE AMOUNT P EXCEEDING MAXIMUM SUPPLY AMOUNT Q | LARGE USE AMOUNT | DANGER LEVEL: HIGH | ERROR | SAFETY SYSTEM | EXCEEDING AMOUNT |

FIG10

(SEQUENTIAL DATA)

| CUSTOMER ID | POWER USE AMOUNT | AT-HOME/OUT-OF-HOME | TIME |
|---|---|---|---|
| A001 | 500Wh | O | 13:00 |

(USER ATTRIBUTE DATA)

| CUSTOMER ID | AREA | ADDRESS | AGE | AVERAGE USE AMOUNT | HEADCOUNT | DR GROUP |
|---|---|---|---|---|---|---|
| A001 | Area A | MINATO-KU, TOKYO~ | .... | 400Wh | 5 | G1 |

(FEEDBACK DATA)

| CUSTOMER ID | POWER USE AMOUNT | AT-HOME /OUT-OF-HOME | AREA | TIME | AVERAGE USE AMOUNT | DR GROUP | RESPONSE TO CONCERTED EFFORT TO SAVE POWER | EXPECTED POWER SAVING AMOUNT | CONCERTED EFFORT RANKING |
|---|---|---|---|---|---|---|---|---|---|
| A001 | 500Wh | O | Area A | 13:00 | 400Wh | G1 | MADE | 100Wh | HIGH |
| A002 | 50Wh | × | Area A | 13:00 | 300Wh | G2 | NOT NONE | 0Wh | INTER-MEDIATE |
| A003 | 800Wh | O | Area A | 13:00 | 500Wh | G1 | NOT NONE | 0Wh | LOW |
| .... | .... | .... | .... | .... | .... | .... | .... | .... | .... |

MONITORING CONTROL SYSTEM AND CONTROL METHOD

TECHNICAL FIELD

The present invention relates to a monitoring control technology for sequentially processing data collected from various data sources to find (detect) a possible phenomenon, producing an appropriate action (event) for the found phenomenon, and outputting control information for causing a system to perform a notification or predetermined control.

BACKGROUND ART

Monitoring systems called smart meter monitoring systems are known, by way of example. The system connects a wattmeter having a communication function to equipment in a house or commercial building such as an air conditioner, light, and thermometer to monitor the operational condition and the like of the equipment through the wattmeter over a network.

PRIOR ART DOCUMENT

Patent Document

[Patent Document 1] Japanese Patent Laid-Open No. 2012-194806

DISCLOSURE OF THE INVENTION

Problems to be Solved by the Invention

It is an object of the present invention to provide a monitoring control system for sequentially processing data collected from various data sources to find (detect) a possible phenomenon, producing an appropriate action (event) for the found phenomenon, and outputting control information for causing a system to perform a notification or predetermined control.

Means for Solving the Problems

A monitoring control system according to an embodiment is configured to detect one of phenomena each leading to a particular result based on at least one data piece received from a single or a plurality of data sources each serving as a data transmission element and to output action information to a predetermined system for the detected particular result. The monitoring control system includes a phenomenon detecting section configured to detect the phenomenon leading to the particular result based on the contiguous data received from the data source based on detecting rule definition data previously specifying a change attribute of the contiguous time-series data pieces for each of the phenomena leading to the particular result, and a determination section configured to extract the action information associated with the particular result detected by the phenomenon detecting section to produce an event for the predetermined system based on action definition data previously specifying the action information for each of the particular results.

MODE FOR CARRYING OUT THE INVENTION

A preferred embodiment will hereinafter be described with reference to the drawings.

A monitoring control system according to the embodiment monitors various data output from information systems which support social infrastructures such as services including power, running water, gas, traffic, communications, medical care, and finance, and detects (including prediction) a possible phenomenon based on the monitored data, thereby producing an event appropriate for the detected phenomenon and outputting control information for causing equipment or a system to perform a notification or predetermined control.

Many technologies for collecting various data to detect a possible phenomenon have conventionally been proposed. However, manual intervention is required to determine what action should be taken for the detected phenomenon and to perform appropriate processing for the determined action, and the detecting, action, and processing are performed independently. Thus, after the detecting of the possible phenomenon, manual operation is needed and a long time is taken to perform the determination of what action is appropriate and to cause the associated equipment or system to perform a notification or predetermined operation.

To address this, the monitoring control system according to the embodiment can control, through a series operations, sequential processing of data collected from various data sources to detect a possible phenomenon, determination of an appropriate action for the detected phenomenon (production of an event), and output processing of causing the associated system to perform a notification or predetermined control for the determined action.

The monitoring control system can also store the result of an action performed actually by the associated system for the determined action (produced event) as feedback information (including the case where no action is performed) to improve the accuracy in phenomenon detection and to provide useful additional information to a system cooperating with the monitoring control system.

Embodiment 1

FIGS. 1 to 10 are diagrams showing the network configuration of the monitoring control system according to Embodiment 1. The monitoring control system 300 according to the present embodiment is connected to a plurality of data sources nodes 100 and is connected to a plurality of system nodes 500 cooperating with the monitoring control system 300.

Figure 1:
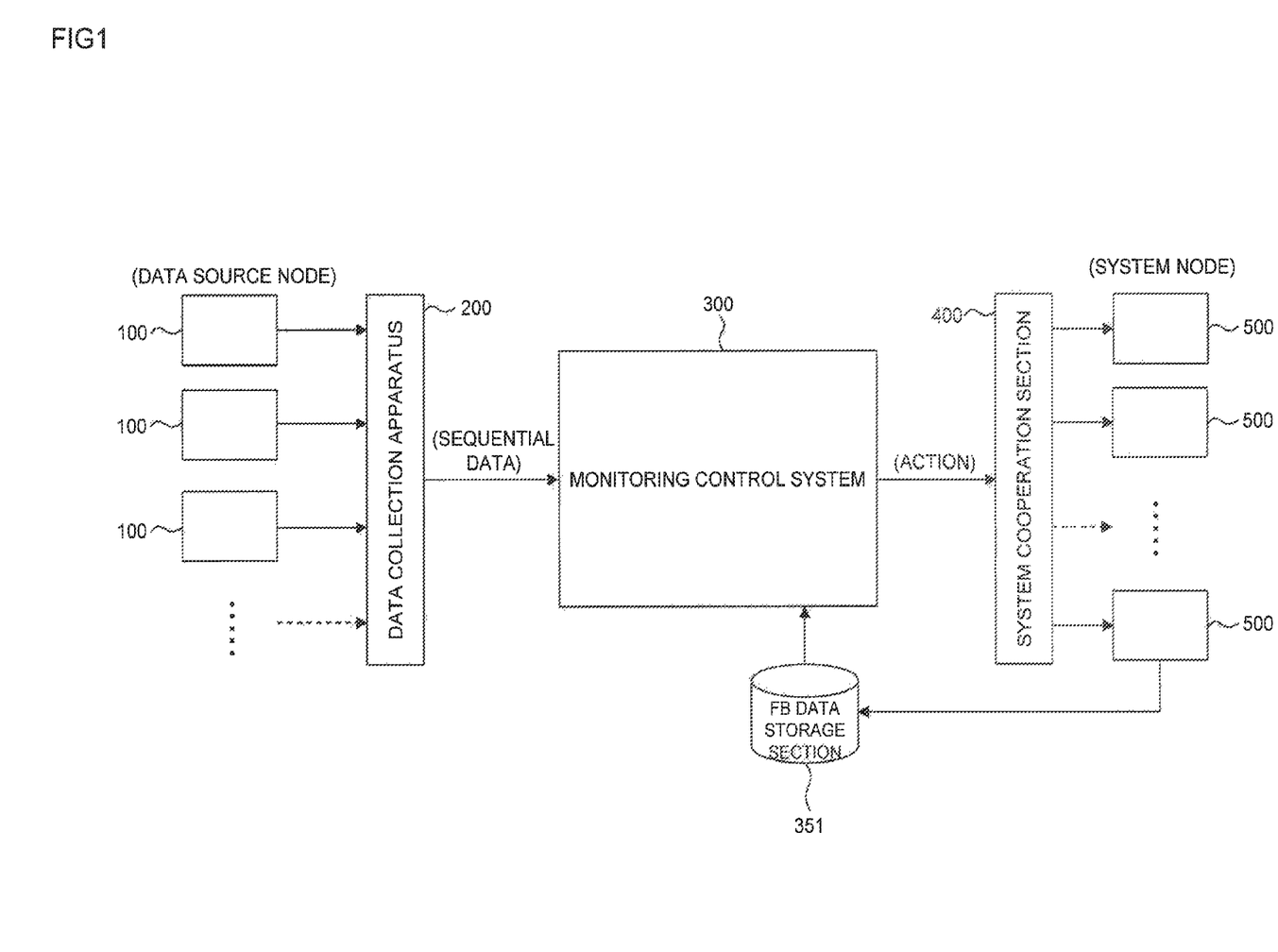
FIG. 1 A diagram showing the network configuration of a monitoring control system according to Embodiment 1.

The data source node 100 is, for example, a data acquirement device such as a wattmeter or a management system connected to a plurality of data acquirement devices to manage and control those data acquirement devices, and corresponds to a node (data transmission element) serving as a data source which transmits data to the monitoring control system 300. The data source node 100 can include a communication section, a processing section, a storage section and the like, although not shown, and outputs contiguous time-series data acquired sequentially from the data acquirement devices and indicating power usage or the like to the monitoring control system 300 over a wired or wireless communication network.

Another example of the data source node 100 is a data acquirement device in each of server apparatuses constituting a WEB system, a customer relationship management (CRM) system, or an enterprise asset management (EAM) system. In this case, the server apparatus itself can serve as a data acquirement device and outputs contiguous time-series data acquired sequentially and indicating the operational status of the server apparatus (including CPU utilization rate, memory use amount, remaining storage area, and operational time) or a traffic amount in the overall system to the monitoring control system 300 over a wired or wireless communication network.

Yet another example of the data source node 100 is a Point of Sale (POS) system. The POS system records commodity sales information at each shop in real time and sends the sales information for inventory management or marketing management to a server apparatus which performs sales management. Such a POS system also corresponds to a data source which transmits sales information acquired by a data acquirement apparatus such as a register and a barcode reader, and outputs contiguous time-series data acquired sequentially and indicating shop sales information (including sales figures, selling price for each commodity, and number of customers) to the monitoring control system 300 over a wired or wireless communication network. A data transmission element which transmits weather information or stock prices can be included in the data source node 100. The data source nodes 100 are individually connected as independent data transmission elements to the monitoring control system 300.

A data collection apparatus 200 collects and outputs data from the plurality of data source nodes 100 to the monitoring control system 300. Since the data output from the data source node 100 is contiguous time-series data, a large amount of data is input from each of the data source nodes 100 to the monitoring control system 300. The data collection apparatus 200 collects a plurality of data pieces input from each of the data source nodes 100, provides load-sharing in a single or a plurality of data collection apparatuses 200, and outputs the data to the monitoring control system 300, between the monitoring control system 300 and each data source node 100.

The monitoring control system 300 performs, in a series of operations, detecting processing of sequentially (in real time) processing the plurality of contiguous time-series data pieces input from each data source node 100 to detect a possible phenomenon, event processing of determining an appropriate action for the detected phenomenon to produce an event, and output processing of outputting control information for causing the associated system (system node 500) to perform a notification or predetermined control for the determined action. The details of each function and processing are later described.

The system node 500 is equipment or a system (for example, a server apparatus constituting the system) which receives the control information (control command) output from the monitoring control system 300 for performing the notification or predetermined control. The system node 500 cooperates with the monitoring control system 300, and in response to an event for the phenomenon detected by the monitoring control system 300, performs a predetermined action based on the control information received from the monitoring control system 300 or receives a message such as an audible alert for promoting the predetermined action.

The system node 500 is connected to the monitoring control system 300 through a system cooperation section 400. The system cooperation section 400 has the delivering function of notifying the associated single or plurality of system nodes 500 of an event produced in the monitoring control system 300 or transmitting a predetermined control command.

The monitoring control system 300 extracts action information in association with the detected phenomenon to produce an event for the system node 500. The monitoring control system 300 outputs the extracted action information to the system cooperation section 400. The system cooperation section 400 transmits the input action information involved in the production of the event to each associated system node 500 over a wired or wireless communication network.

The system node 500 and the data source node 100 may be the same node. For example, the monitoring control system 300 uses a server apparatus in a WEB system as the data source node to receive sequential time-series data indicating the operational status and the traffic amount in the overall WEB system. The monitoring control system 300 detects a predetermined phenomenon based on the sequential data received from the WEB system and determines a predetermined action associated with the detected phenomenon to produce an event. Then, the monitoring control system 300 can output the predetermined action determined (extracted) from the detected phenomenon to the same server apparatus in the WEB system serving as the system node through the system cooperation section 400.

The system node 500 and the data source node 100 may be different nodes in an aspect. By way of example, the data source node 100 may be a weather observation instrument such as a rain gauge (also capable of measuring accumulated snow), thermometer, and hygrometer, and the system node 500 may be a field service system. In this case, the monitoring control system 300 uses the weather observation instrument as the data source node to receive sequential data indicating the rainfall amount (accumulated snow), temperature, or humidity. The monitoring control system 300 detects a phenomenon based on the sequential data received from the weather observation instrument and determines a predetermined action associated with the detected phenomenon to produce an event. The monitoring control system 300 can output a predetermined action (for example, a message indicating an expected increase in car accident due to increased accumulated snow or a control command for broadcasting a predetermined message from the field service system to the information terminal apparatuses of workers)

to the field service system serving as the system node 500 through the system cooperation section 400.

Figure 2:
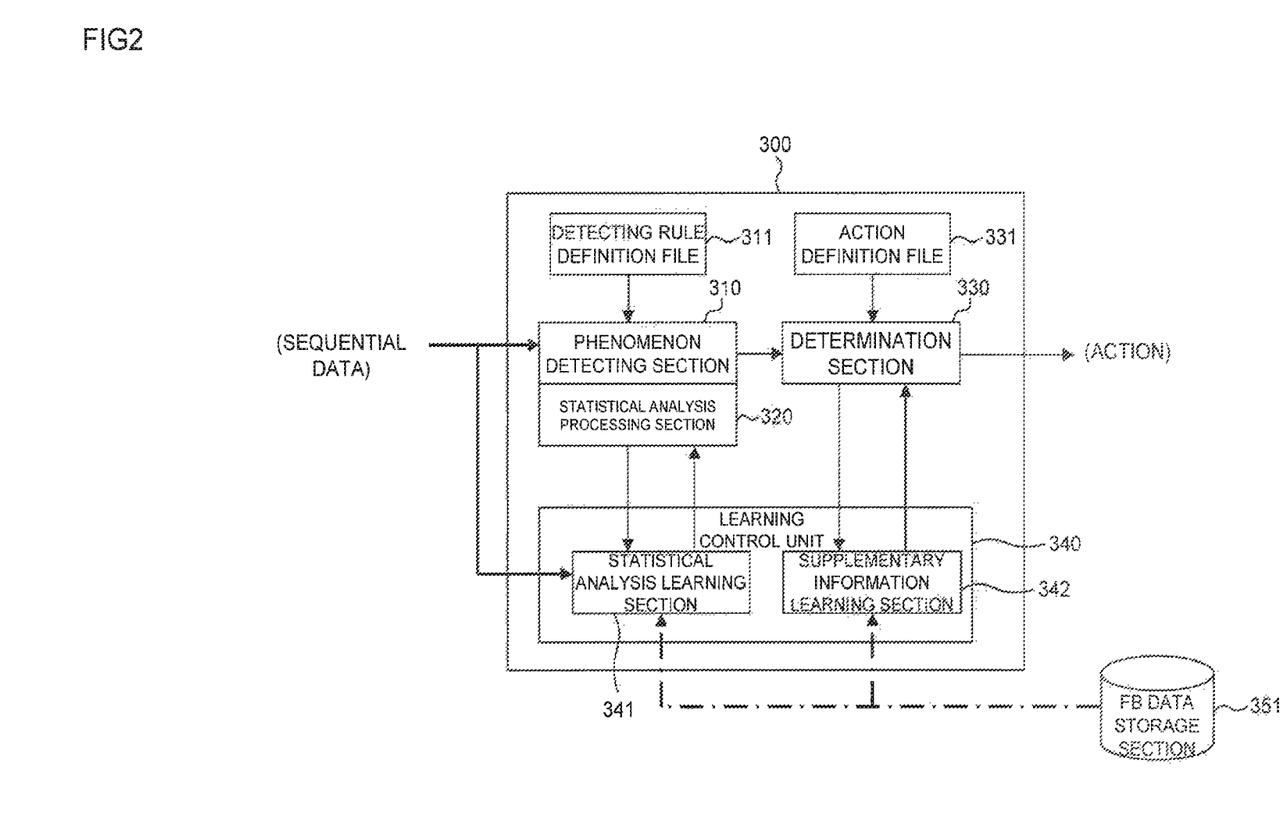
FIG. 2 A block diagram showing the configuration of the monitoring control system according to Embodiment 1.

Next, the monitoring control system 300 of the present embodiment is described in detail. FIG. 2 is a block diagram showing the configuration of the monitoring control system 300.

As shown in FIG. 2, the monitoring control system 300 is configured to include a phenomenon detecting section 310 for receiving contiguous time-series data from each data source node 100 and detecting a predetermined phenomenon based on a detecting rule definition file 311, a statistical analysis processing section 320 for statistically analyzing the sequential data acquired during a fixed time period and outputting the statistical analysis result to the phenomenon detecting section 310, and a determination section 330 for extracting a predetermined action from an action definition file 331 to produce an event for the predetermined phenomenon detected by the phenomenon detecting section 310 and outputting the extracted predetermined action as action information involved in the production of the event to the system cooperation section 400.

The monitoring control system 300 can also include a learning control unit 340 and a feedback data storage section 351. The learning control unit 340 can be configured to include a statistical analysis learning section 341 for calculating learning values such as parameters for the statistical analysis used by the statistical analysis processing section 320 based on feedback data to the action information collected from the system node 500 and a supplementary information learning section 342 for updating supplementary information included in the action information output from the determination section 330.

The information such as the detecting rule definition file 311 and the action definition file 331, the feedback data, and various information for use in the statistical analysis processing and learning processing can be stored in a predetermined storage area (not shown) of the monitoring control system 300.

Figure 3:
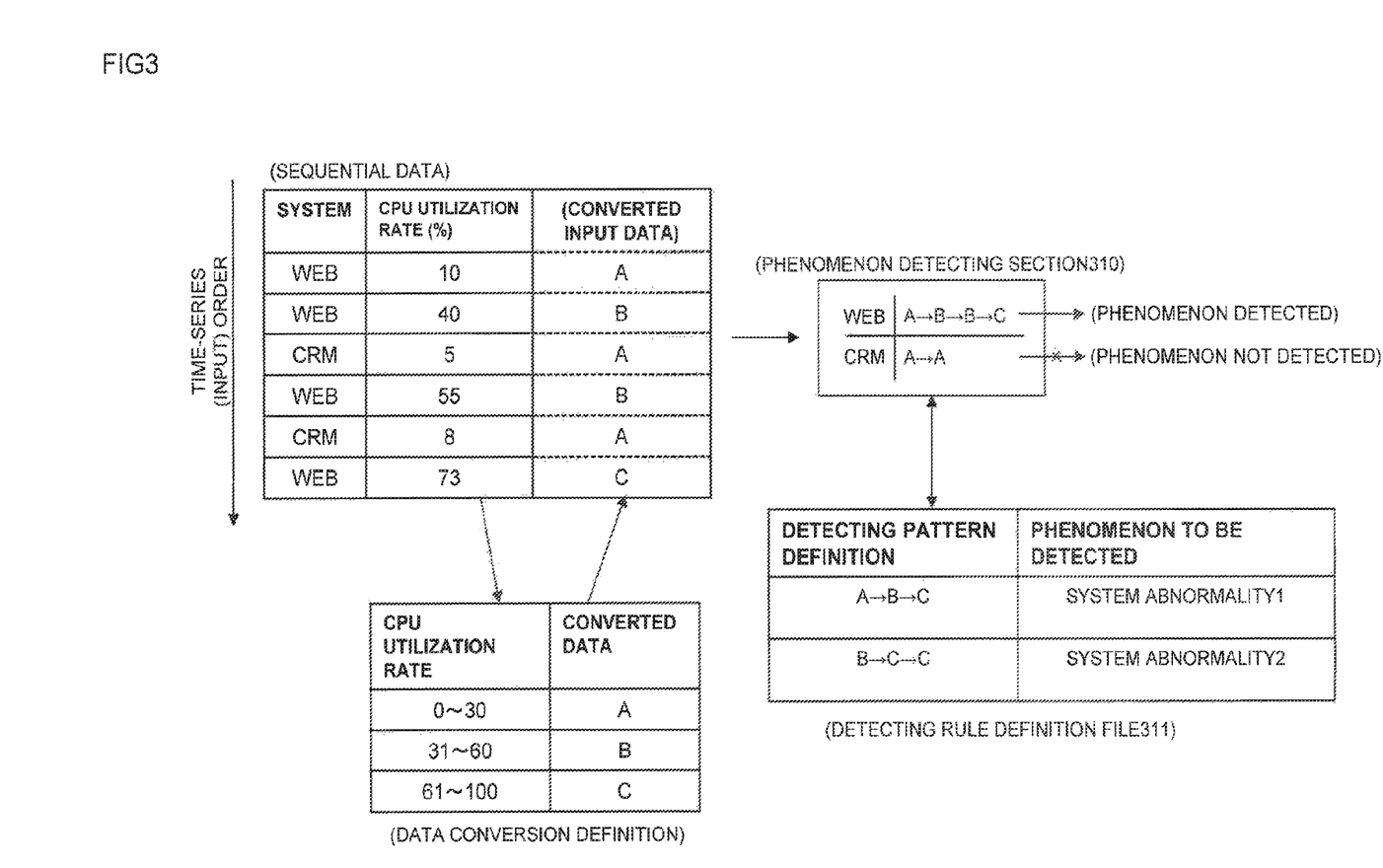
FIG. 3 A diagram for explaining phenomenon detecting processing according to Embodiment 1.

FIG. 3 is a diagram for explaining the phenomenon detecting processing in the present embodiment. As shown in FIG. 3, for example, the phenomenon detecting section 310 receives input of each data in a data format including a system type (information identifying the data source node 100 such as WEB or CRM) and a CPU utilization rate (sequential data including actually measured value or acquired value in the system for detecting a phenomenon).

Upon input of a plurality of contiguous time-series data pieces transmitted from each data source node 100, the phenomenon detecting section 310 detects a predetermined phenomenon from a change in contiguous time-series data pieces of one system type, for example.

In the example shown by FIG. 3, a data conversion definition is previously set in which the CPU utilization rates from 0% to 100% are classified into a plurality of predetermined categories, and a predetermined phenomenon is detected based on a change in the category converted from the sequential data. The data conversion definition is used to match the time constants in those sequential data pieces and to allow easy recognition of a change in the contiguous time-series data corresponding to a predetermined phenomenon by classifying the numerical data. Alternatively, the input sequential data may be used without the data conversion for detecting a predetermined phenomenon.

As shown in FIG. 3, the conversion of the CPU utilization rate input from the data source node 100 according to the data conversion definition can show that the CPU utilization rate of the system type "WEB" transitions from A, B, B, and then C.

The detecting rule definition file 311 is a file which includes definition information (detecting rule definition data) provided by associating a chronological pattern of transition (sequence in chronological order) according to the data conversion definition with a particular phenomenon. The phenomenon detecting section 310 refers to the detecting rule definition file 311 to determine whether or not the transition of the CPU utilization rate in chronological order (categories after data conversion) matches any pattern predefined for a particular phenomenon, and when a match is found, detects that the particular phenomenon has occurred or that the particular phenomenon will occur.

Each pattern in the detecting rule definition file 311 of the present embodiment is information for detecting a pattern associated with a phenomenon leading to a particular result from the sequential data pieces arranged in chronological order. By way of example, for a pattern (phenomenon) leading to a "system abnormality (result)," definition can be made as appropriate from the past statistical data and empirical rules such that the "system abnormality" is detected when the sequential data transitions in a pattern of A, B, and then C in chronological order. Although the description is made of the example in which the predetermined pattern is detected from the plurality of time-series data pieces input from the data source node 100 to detect a phenomenon leading to a particular result, the present invention is not limited thereto, and for example, a single data piece can be used to detect a phenomenon leading to a particular result. In other words, the sequential data means a single data piece or a plurality of data pieces sequentially input to the monitoring control system over time.

The pattern associated with the phenomenon leading to the particular result can be created with a known phenomenon pattern extraction technology. For example, the technologies described in U.S. Pat. Nos. 4,181,193, 1,398,907, 4,202,798, and 4,398,777 can be used to create a pattern associated with a phenomenon leading to a particular result. The detecting rule definition file 311 can be updated as appropriate. These phenomenon pattern extraction technologies can be used to newly produce a relationship between sequentially changing data and an associated phenomenon or to change an already created pattern associated with a phenomenon leading to a particular result.

In the example of FIG. 3, the phenomenon detecting section 310 detects the transition of A, B, and then C of the data in chronological order associated with a phenomenon leading to the "system abnormality" for the system "WEB," but does not detect any phenomenon for the system "CRM." In the present embodiment in which the detecting rule definition file 311 defines the phenomenon pattern of "A, B, and then C," the input of "A and then B" can be identified even when A or C is input after the input of A and before the input of B in chronological order, and after that, the input of "A, B, and then C" can be identified even when A or B is input after the input of B and before the input of C.

In other words, even when data input during a certain time period is input in the order of "A(*), C, B(*), B, A, and then C(*)," the phenomenon detecting section 310 can determine that the data pieces marked with (*) match the chronological pattern "A, B, and then C" defined in the detecting rule definition file 311, and assume that the phenomenon pattern associated with the "system abnormality" is detected. The order of data input in chronological order may be taken into account in the pattern matching.

A plurality of phenomenon patterns may be set in association with a single result (system abnormality). For example, chronological patterns of data sequence of "A, B, and then C," "B, B, and then C," and "C, B, and then C" can be defined as being associated with the "system abnormality." In this case, each of the chronological patters can be assigned a priority based on reliability (for example, the scale of original data) or occurrence probability (for example, the probability of occurrence of the phenomenon pattern). For example, when the priority is assigned based on the reliability, preferential matching of the pattern "B, B, and then C" is defined since this pattern has the highest reliability of the phenomenon patterns associated with the system abnormality. When the priority is assigned based on the probability, preferential matching of the "C, B, and then C" is defined since this pattern has the highest probability of the phenomenon patterns associated with the system abnormality. In this manner, the pattern detected with a higher priority can be previously set among the plurality of phenomenon patterns.

Figure 4:
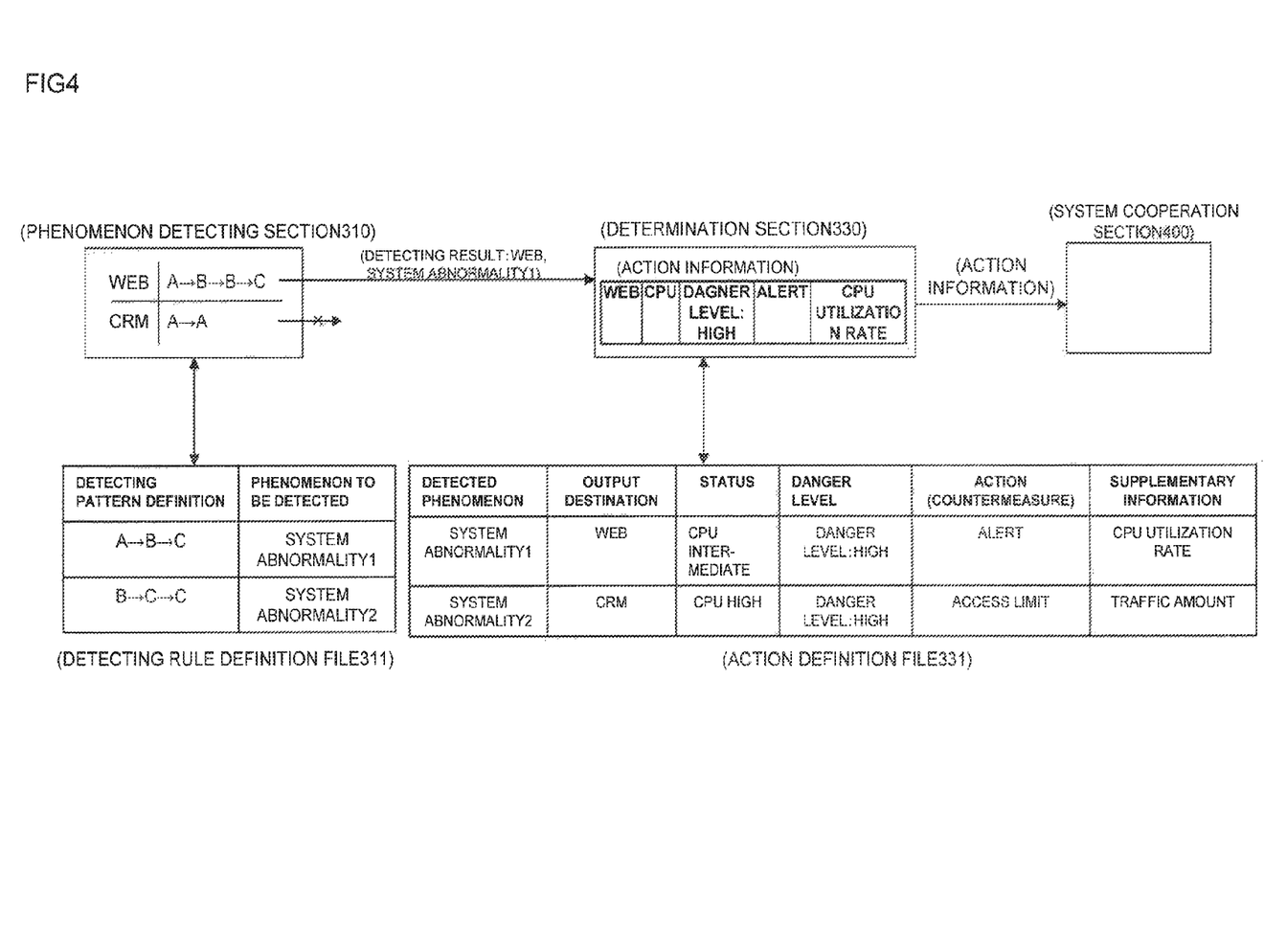
FIG. 4 A diagram for explaining event production processing for a detected phenomenon according to Embodiment 1.

When the chronological sequence of continuously input time-series data matches any particular phenomenon pattern defined in the detecting rule definition file 311, the phenomenon detecting section 310 outputs the detecting result to the determination section 330. FIG. 4 is a diagram for explaining event production processing in the determination section 330 of the present embodiment.

As shown in FIG. 4, the phenomenon detecting section 310 outputs information including the system type "WEB" and the result "system abnormality" estimated from the phenomenon pattern as the detection result to the determination section 330. Based on the input detection result, the determination section 330 determines what action should be performed in response to the result "system abnormality" estimated from the phenomenon pattern and produces an event for the cooperating system node.

The present embodiment includes the action definition file 331 in which the estimated result "system abnormality" is previously associated with a predetermined action. The action definition file 331 is information in which each of the detected particular phenomena in the detecting rule definition file 311 is linked to a single or a plurality of action information pieces. Thus, as shown in the example of FIG. 4, the determination section 330 refers to the action definition file 331 by using, as a key, the detected phenomenon "system abnormality" included in the detection result output from the phenomenon detecting section 310 to extract the associated action information.

The determination section 330 extracts (produces) the predetermined action for the detected phenomenon to produce an event for each cooperating system node and outputs the action information involved in the event production to the system cooperation section 400 responsible for controlling the delivery of the action information to each system node. The determination section 330 outputs the action information together with an "output destination" included in the action definition file 331 to the system cooperation section 400, so that the system cooperation section 400 can deliver the action information to the system node 500 corresponding to the "output destination."

In the example of FIG. 4, the action information includes the output destination, the status of the output destination ("CPU intermediate"), danger level ("high"), and action (alert or access limit), for example. The status of the output destination and the danger level represent the details of the detected phenomenon. The action represents a countermeasure which specifies that the associated system node 500 is notified of the detected phenomenon (message content) or that the system node 500 is caused to perform predetermined control (control command). An application program operating on the monitoring control system 300 may be executed and the execution result may be included in the action.

The supplementary information is added to the action information and is predefined as useful information for the detected phenomenon for each action information. The exemplary action information of FIG. 4 include the actually measured value of the CPU utilization rate and the traffic amount in the overall WEB system as the supplementary information from the sequential data pieces arranged in chronological order acquired at the time of the detecting of system abnormality.

Figure 5:
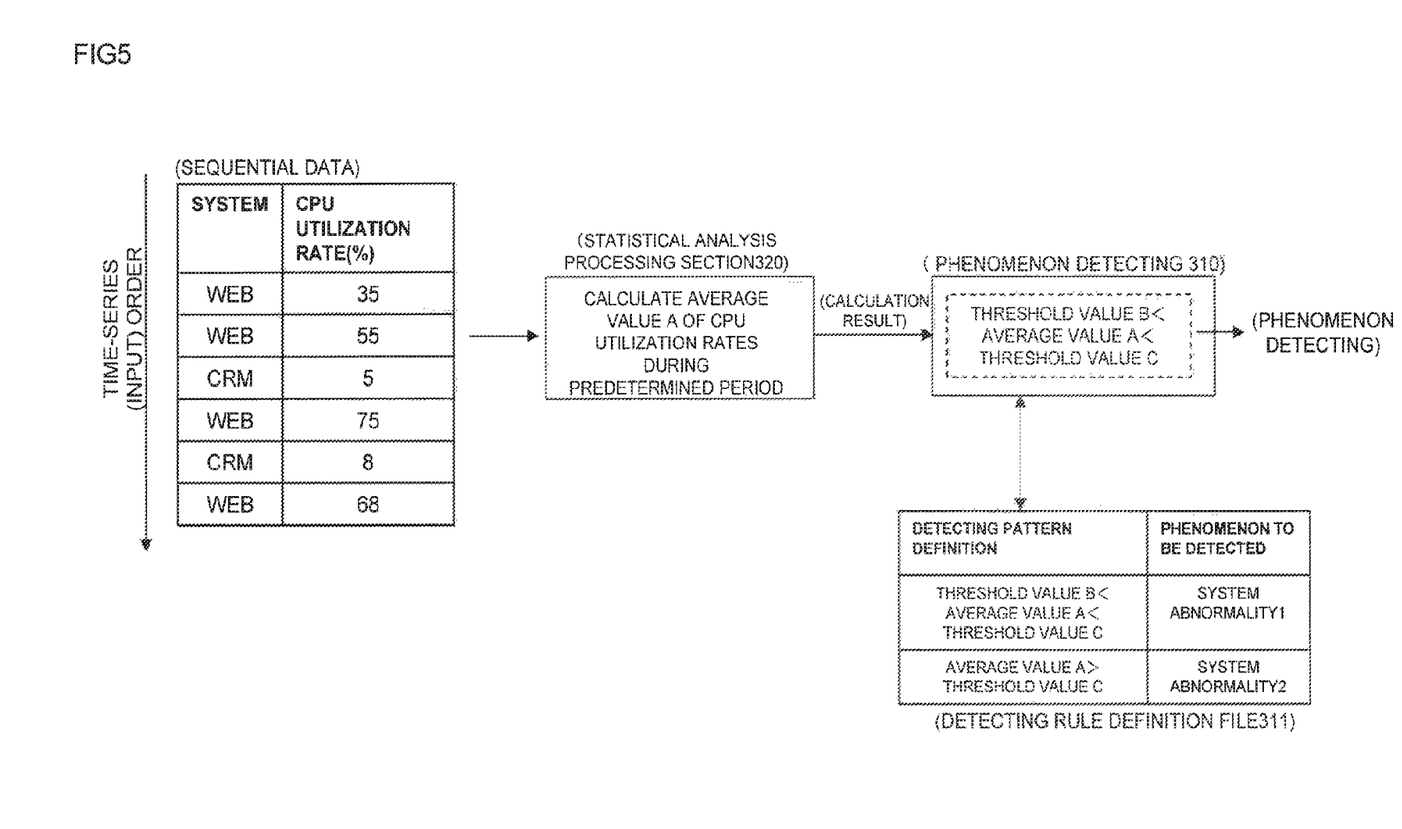
FIG. 5 A diagram for explaining phenomenon detecting processing based on statistical analysis processing according to Embodiment 1.

FIG. 5 is a diagram for explaining phenomenon detection processing based on the statistical analysis processing. The phenomenon detecting section 310 can detect a phenomenon leading to a particular result by using the statistical results of statistical analysis in the statistical analysis processing section.

For example, the statistical analysis processing section 320 performs statistical processing of the sequential time-series data received from the data source 100 during a fixed time period. In the example of FIG. 5, the statistical analysis processing section 320 can perform statistical processing of calculating the average value of the CPU utilization rates during a fixed time period to output the calculated statistical result "average value" to the phenomenon detecting section 310.

The phenomenon detecting section 310 can compare the statistical result output from the statistical analysis processing section 320 with a predetermined threshold value previously specified in the detecting rule definition file 311 to detect that a phenomenon leading to a particular result will occur. The detecting rule definition file 311 can include the relationship between a statistical result and a predetermined threshold value for each phenomenon leading to a particular result as a change attribute for a phenomenon to be detected.

In the example of FIG. 5, a detection pattern definition is specified such that a system abnormality is detected when an average value A of the statistical result is larger than a first threshold value B and smaller than a second threshold value C or when the average value A is larger than the second threshold value C. The average value A can be compared with the threshold values B and C to see the change attribute such as the relationship between the magnitudes thereof, thereby detecting the presence or absence of occurrence of a particular phenomenon.

As described above, the present embodiment includes the first phenomenon detecting processing of detecting a particular phenomenon based on the chronological pattern of the sequence of the sequential time-series data input from the data source nodes 100 and the second phenomenon detecting processing of detecting a particular phenomenon based on the statistical result of the sequential time-series data received from the data source node 100 during the fixed time period. Since the first and second phenomenon detecting processing can be performed independently of each other, a phenomenon which cannot be detected based on the chronological pattern of the sequence of the sequential data can be detected based on the statistical result during the fixed time period, or conversely, a phenomenon which cannot be detected based on the statistical result can be detected based on the chronological pattern of the sequence of the sequential data. Thus, a particular phenomenon can be detected with high accuracy from the contiguous time-series data sequentially input from the data source nodes 100.

Figure 6:
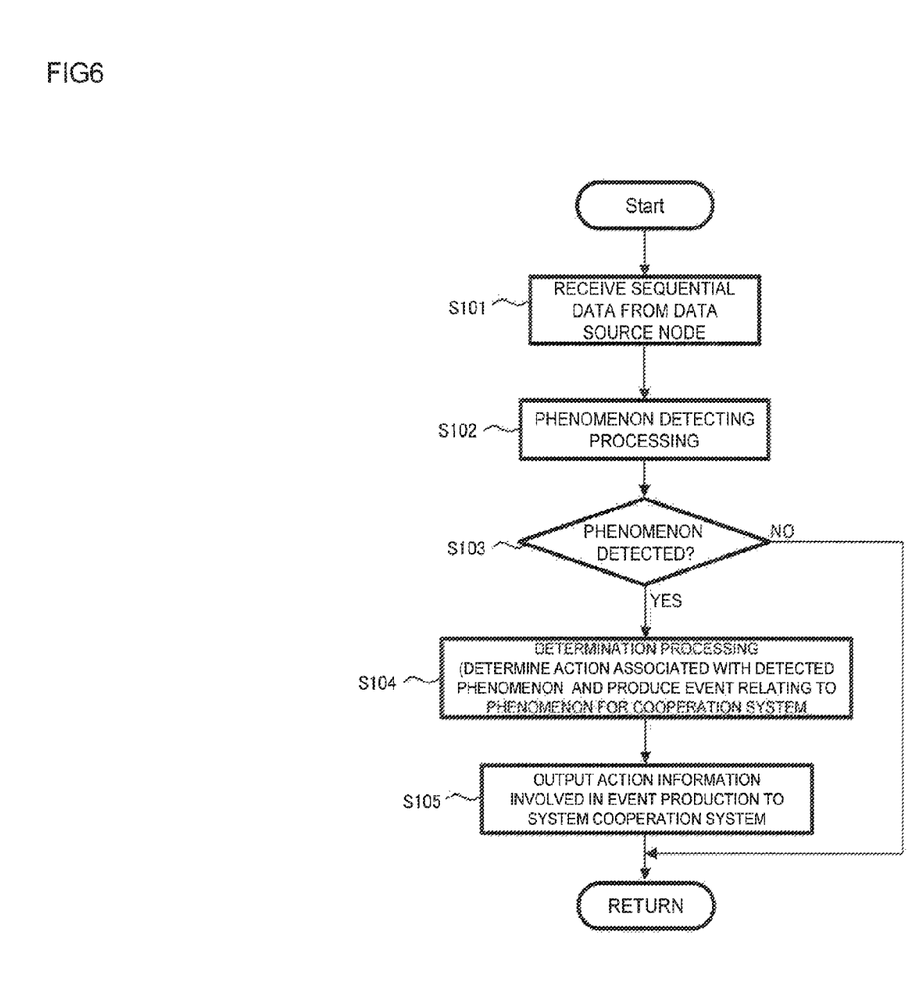
FIG. 6 A diagram showing a processing flow in the monitoring control system according to Embodiment 1.

FIG. 6 is a diagram showing a processing flow in the monitoring control system 300 of the present embodiment. As shown in FIG. 6, the monitoring control system 300 receives sequential time-series data from the plurality of data source nodes 100 through the data collection apparatus 200 (S101).

The monitoring control system 300 detects the presence or absence of occurrence of any particular phenomenon specified in the detecting rule definition file 311 based on the sequential time-series data received sequentially (S102). As described above, the monitoring control system 300 independently performs the first phenomenon detecting processing of detecting a particular phenomenon based on the chronological pattern of the sequence of the sequential time-series data input from the data source nodes 100 and the second phenomenon detecting processing of detecting a particular phenomenon based on the statistical result of the sequential time-series data pieces received from the data source nodes 100 during the fixed time period.

Upon detecting of a particular phenomenon specified in the detecting rule definition file 311 (YES at S103), the monitoring control system 300 extracts (produces) a predetermined action associated with the detected phenomenon to produce an event for each cooperating system node 500 (S104). The monitoring control system 300 outputs the extracted action information involved in the event production to the system cooperation section 400 responsible for controlling delivery to each system node 500 (S105).

The monitoring control system 300 according to the present embodiment can control, through a series of operations, sequential processing of the data collected from various data source to detect a possible phenomenon, determination of an appropriate action for the detected phenomenon (production of the event), and output for causing the associated system to perform a notification or predetermined control for the determined action. This allows the detecting of the phenomenon, the determination of the appropriate action, and the processing on the associated system to be performed automatically without manual intervention to realize quick system monitoring and the like.

Next, the learning processing in the present embodiment is described with reference to FIG. 7 and FIG. 8. The monitoring control system 300 of the present embodiment can include the feedback data storage section 351 for storing feedback information provided by a system node 500 in response to the action information output to that system node 500. The learning control unit 340 can perform the learning processing with a known technology or approach of Machine Learning, in addition to the following one.

Figure 7:
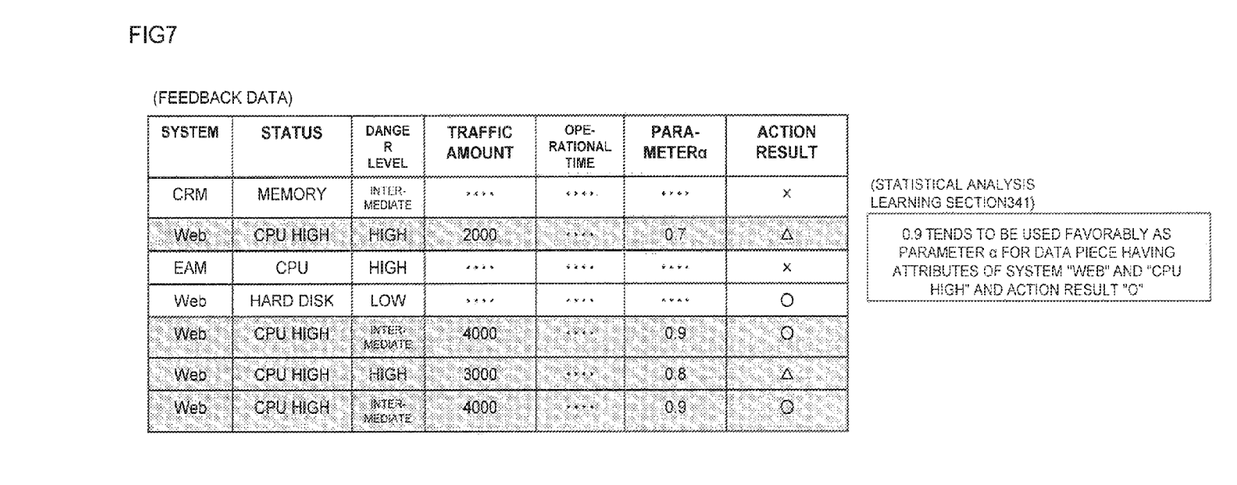
FIG. 7 A diagram for explaining feedback data and processing in a statistical analysis learning section of the monitoring control system according to Embodiment 1.

FIG. 7 is a diagram showing an example of the feedback information and is a diagram for explaining the learning processing in the statistical analysis learning section 341.

As shown in FIG. 7, action results can be stored as the feedback information and can include what countermeasure was actually performed by a system node 500 in response to the action information output to that system node 500, whether the action information was appropriate, and whether the countermeasure was appropriately performed with the action information. The action results can be obtained through manual telephone, fax, or a feedback information acquiring function of a computer. The feedback information can be stored in the feedback data storage section 351 by an operator performing input with a keyboard or by automatic acquisition.

The statistical analysis learning section 341 calculates the learning value of a parameter $\alpha$ to be applied to the statistical processing shown in FIG. 5. For example, the statistical analysis learning section 341 refers to the feedback information to find that 0.9 tends to be used favorably as the parameter $\alpha$ for the data piece having the attributes of the system type "WEB" and the status "CPU high," and the action result "O."

The parameter $\alpha$ is, for example, a weighting value applied to each sequential data of each CPU utilization rate and varies with the traffic amount. The parameter $\alpha$ can be controlled to be variable in performing the statistical analysis such that the CPU utilization rate with a large traffic amount is reflected significantly in the average value and the CPU utilization rate with a small traffic amount is reflected insignificantly in the average value.

In the example of FIG. 7, it can be determined, with reference to "O" of the action result, that the application of 0.9 to the parameter $\alpha$ is preferable even in a small traffic amount. Specifically, since the action result "O" is not present when the parameter $\alpha$ is smaller than 0.9, the fact that the setting of 0.9 as the parameter $\alpha$ applied to the statistical analysis is preferable irrespective of the traffic amount can be learned.

The total number of feedback information pieces can be set as the reflection level of a calculated parameter value. For example, the degree of sufficiency of learning is set by using a threshold value of the total number of feedback information pieces. When the total number of feedback information pieces is larger, a higher reflection level of the parameter value is set assuming that the learning is sufficient. Conversely, when the total number of feedback information pieces is smaller, a lower level is set since the learning is not sufficient.

The learning processing may be configured such that attribute information for each system type or each user obtained from sequential time-series data is previously held as accumulated data and then a learning value is calculated based on the accumulated data according to the ranking of each system use state or the ranking of a user attribute. For example, the learning processing can be performed such that the degree of system monitoring is increased with the ranking and the reflection in the learning value is adjusted according to the ranking.

The learning value of the parameter $\alpha$ calculated in the statistical analysis learning section 341 is output to the statistical analysis processing section 320 and is used as a weighting value in statistical analysis. The statistical analysis processing section 320 performs the statistical analysis by using the learning value output as appropriate from the learning control unit 340.

Figure 8:
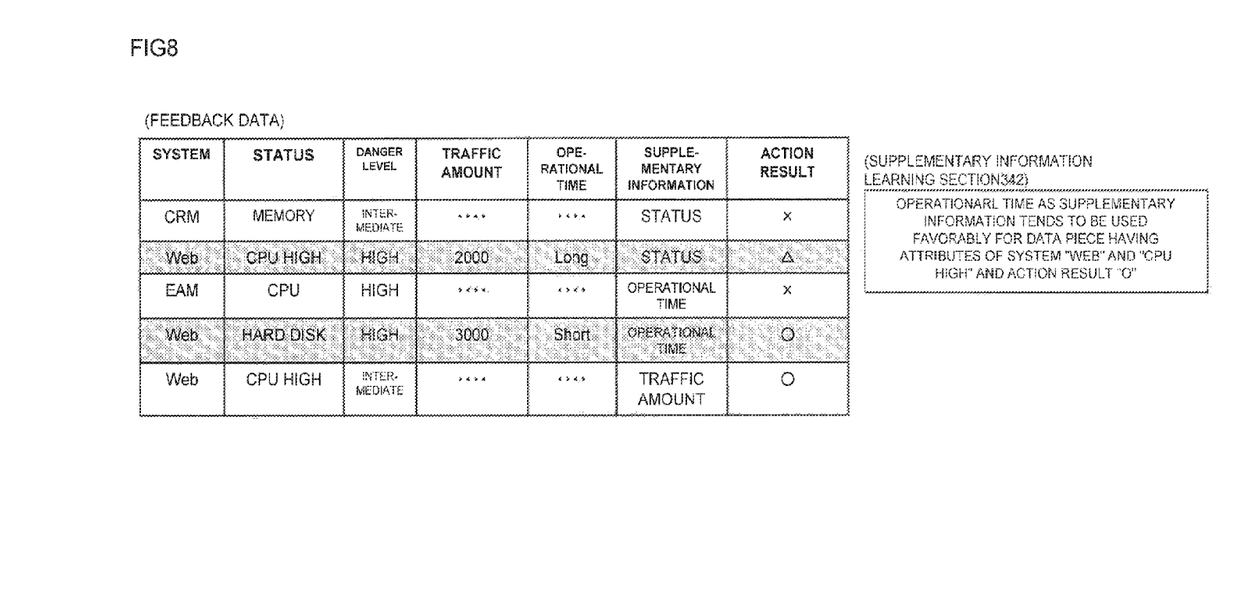
FIG. 8 A diagram for explaining feedback data and processing in a supplementary information learning section of the monitoring control system according to Embodiment 1.

FIG. 8 is a diagram showing another example of the feedback information and is a diagram for explaining the learning processing in the supplementary information learning section 342.

Although the example of FIG. 7 includes the learning processing on the parameter $\alpha$ used in the statistical analysis, the example of FIG. 8 includes the learning processing on the "supplementary information".

For example, the supplementary information learning section 342 refers to feedback information to find that the addition of "operational time" as the supplementary information tends to be performed favorably for the data piece having the attributes of the system type "WEB" and the status "CPU high," and the action result "O." For example, the supplementary information learning section 342 can count "supplementary information" of each action information having the action result "O" and extract the information having a high count as supplementary information to the information that was usefully used in the system node 500 and was fed back with the action result "O."

The supplementary information learning section 342 extracts useful supplementary information based on the feedback information and outputs the extracted useful supplementary information to the determination section 330. The determination section 330 can use the supplementary information received from the supplementary information learning section 342 to perform control of outputting the action information including the supplementary information to the system node 500. Similarly to the above, the learning processing in the supplementary information learning section 342 can be performed such that accumulated data as described above is used to adjust the reflection in the learning value according to the ranking.

Figure 9:
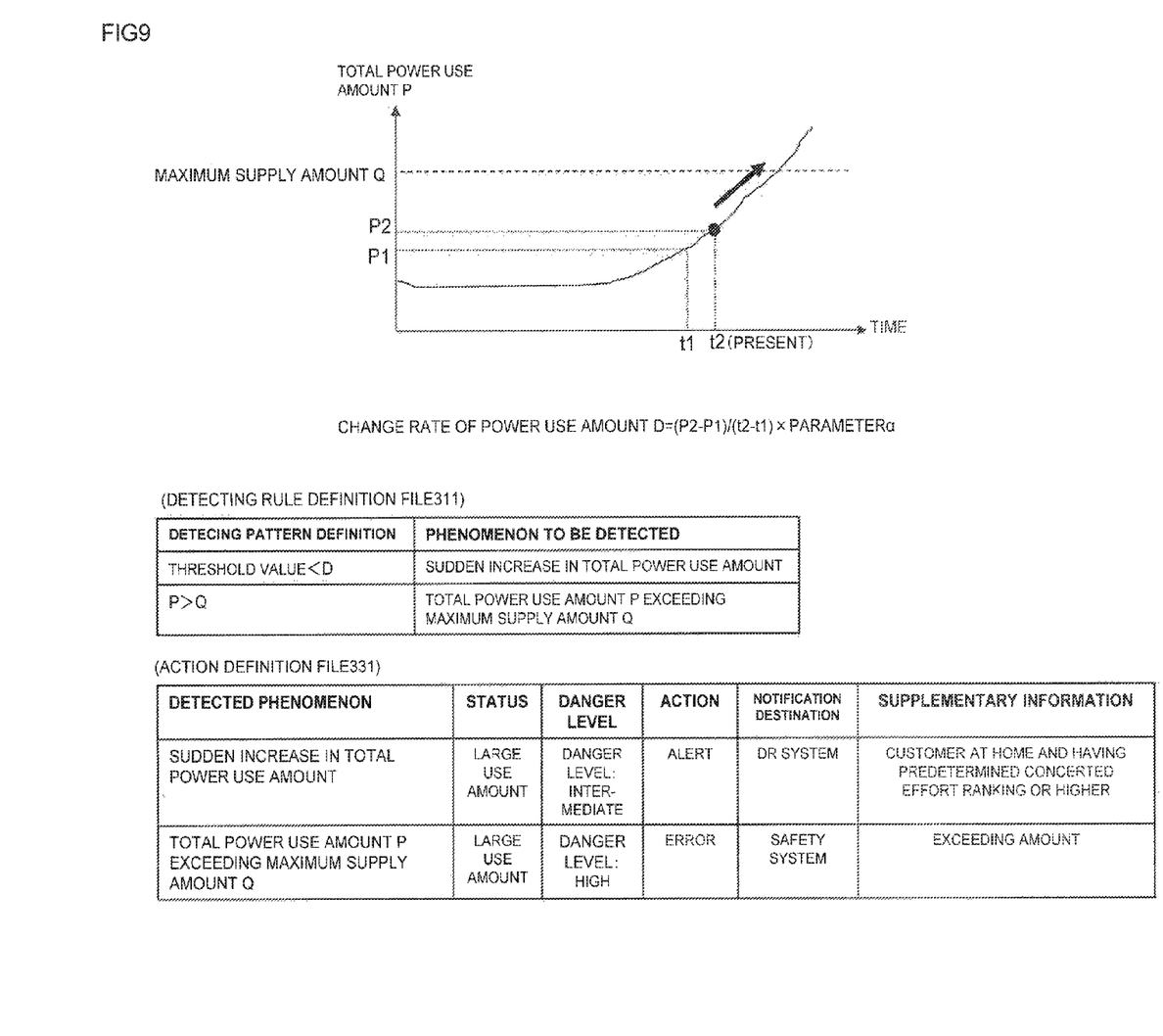
FIG. 9 A diagram showing an example in which the monitoring control system according to Embodiment 1 is applied to demand response of power use amount to power supply amount.
Figure 10:
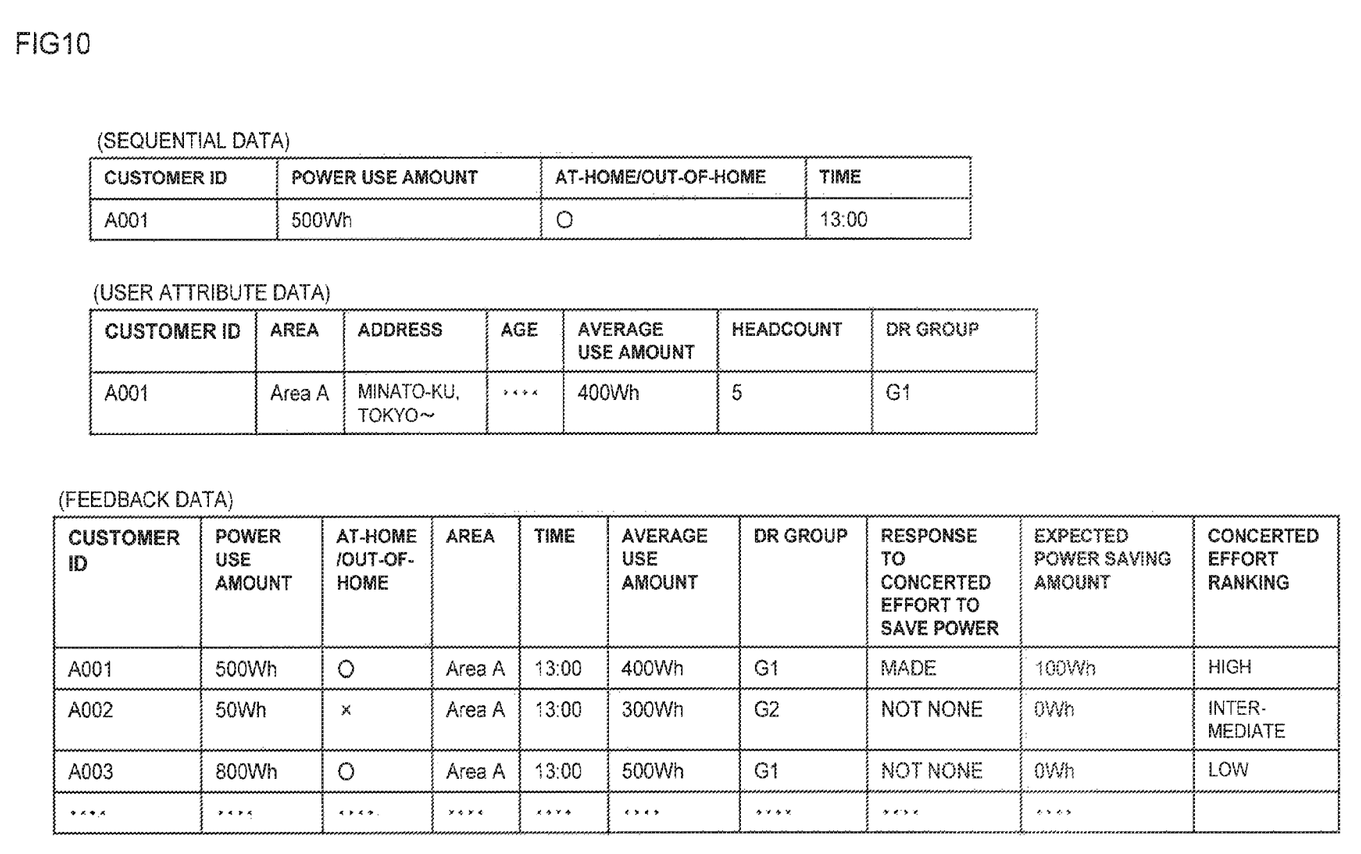
FIG. 10 A diagram showing an example of sequential data, user attribute data, and feedback data in the example of FIG. 9.

FIG. 9 is a diagram showing an example in which the monitoring control system 300 of the present embodiment is applied to demand response (DR) of power use amount to power supply amount. FIG. 10 is a diagram showing an example of sequential data, user attribute data, and feedback data input to the monitoring control system 300 when a data source node in the example of FIG. 9 is a wattmeter.

For example, when a concerted effort to save power is desired in order to reduce the peak value of power use amount, a request for concerted effort to save power can be optimized such that the peak value does not exceed a target maximum limit amount.

In such a case, the monitoring control system 300 acquires power use amounts of customers as the sequential data from wattmeters serving as the data source nodes 100 to calculate the total power use amount and promptly detects a shortage of supply from the pattern of usage.

When the shortage of supply is detected, that is, when a phenomenon leading to the shortage of supply is detected, the monitoring control system 300 requests the concerted effort to save power of customers and the like through the system cooperation section 400. Such a request corresponds to the event processing of extracting the action information to produce an event. The request to the customers (action information) is transmitted to the DR system connected to the monitoring control system 300 through the system cooperation system 400, and the DR system makes a request to the information terminal apparatuses or the like of the customers over a communication network based on the action information.

In this case, the monitoring control system 300 acquires whether or not request for the concerted effort to save power was responded to in the feedback data from the DR system, uses the learning function to estimate the attributes of the customers requested to make the concerted effort to save power, and updates the action information (corresponding to additional information).

For example, the statistical analysis processing section 320 continuously receives in temporal sequence the sequential data including customer IDs, power use amounts, at-home or out-of-home information, and point in time. The statistical analysis processing section 320 calculates a change rate D between power use amounts P2 and P1 representing a change during the period from a time t1 to a time t2 and outputs the change rate D to the phenomenon detecting section 310.

The detecting rule definition file 311 includes a detecting rule specifying the relationship between the change rate D of the power use amount and a threshold value as a change attribute. The phenomenon detecting section 310 compares the change rate D with the threshold value, and when the change rate D is larger than the threshold value D, detects the occurrence of a phenomenon of the total power use amount suddenly increasing.

The statistical analysis processing section 320 can also perform the processing of summing the power use amounts in the sequential data received continuously in temporal sequence to calculate a total power use amount P up to the present time. In this case, the detecting rule definition file 311 includes a detecting rule specifying the relationship between the maximum power supply amount and the total power use amount P in the statistical result as a change attribute. The phenomenon detecting section 310 compares the total power use amount P with the maximum supply amount Q, and when the total power use amount P is larger than the maximum supply amount Q, detects the occurrence of a phenomenon of the total power use amount P exceeding the maximum supply amount Q.

The determination section 330 receives the detecting result from the phenomenon detecting section 310 and extracts the action information linked to the detected phenomenon included in the detecting result from the action definition file 331 to produce an event. When the phenomenon of the power use amount suddenly increasing is detected, the determination section 330 extracts the action information including large use amount (status), intermediate danger level (danger level), alert (action), DR system (notification destination), and information of customers at home and having a predetermined concerted effort ranking or higher (supplementary information). The supplementary information can be produced in real time by the determination section 330 or the supplementary information learning section 342 using a concerted effort ranking and at-home/out-of-home information in feedback data, later described.

When the phenomenon of the total power use amount P exceeding the maximum supply amount Q is detected, the determination section 330 extracts the action information including large use amount (status), high danger level (danger level), error (action), safety system (notification destination), and exceeding amount (supplementary information). The exceeding amount included as the supplementary information can be calculated by the determination section 330 calculating the difference between the total power use amount P and the maximum supply amount Q. The safety system is a predetermined facility or system in which the power use can be reliably cut or power saving is forcedly performed.

The user attribute data is customer attribute data. For example, the user attribute data includes the average use amount, family members, address, and group information of the DR system, and can be previously registered (stored) in a predetermined storage section based on the past power use history or the like.

As shown in FIG. 10, the feedback data includes the concerted effort ranking representing whether or not the customer responded to the request for concerted effort to save power from the DR system based on the action information. The concerted effort ranking is information calculated from the feedback data such as the number of responses to the request for concerted effort to save power based on an active input or the like of the customer indicating an actual effort to save power. The supplementary information learning section 342 can use the number of responses or the like to the request for concerted effort to save power received from the DR system as the feedback data to produce the concerted effort ranking as the feedback information.

The feedback data can include an expected power saving amount. The expected power saving amount is an expected value of savable power amount calculated by subtracting the current power use amount from the past average use amount. In the present embodiment, the processing of the statistical analysis learning section 341 using the feedback data includes, for example, reflecting the expected power saving amount of a customer at home and having a predetermined concerted effort ranking or higher in the parameter α used in calculating the change rate D by the statistical analysis processing section 320.

A parameter α can be calculated by using the expected power saving amount and the number of customers at home. When many customers respond to the expected power saving, much power saving can be expected, and thus the parameter α can be used to calculate a change rate D lower than that when much power saving is not expected.

The statistical analysis learning section 341 in the present embodiment refers to the feedback data to learn the parameter α used in calculating the change rate D by the statistical analysis processing section 320. As a result, the monitoring control system can detect a phenomenon such as a sudden increase in the total power use amount by using the change rate D of the power user amount with higher accuracy.

The monitoring control system of the present embodiment can be realized in a single or a plurality of computer apparatuses, and each of the functions can be configured as a program. For example, a program for each function of the monitoring control system can be stored on an auxiliary storage apparatus, not shown, of a computer, a control unit such as a CPU can read the program stored on the auxiliary storage apparatus to a main storage apparatus, and the program read to the main storage apparatus can be executed by the control unit to cause the single or plurality of computers to perform the function of each component in the present embodiment. Thus, the single or plurality of computers on which the program for each function of the monitoring control system of the present embodiment is installed can operate as computer apparatuses (systems) which achieve each function alone or in combination.

The program may be recorded on a computer readable recording medium and provided for a computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

Although the preferred embodiment of the present invention has been described, that embodiment is illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 DATA SOURCE NODE
200 DATA COLLECTION APPARATUS
300 MONITORING CONTROL SYSTEM
310 PHENOMENON DETECTING SECTION
311 PHENOMENON DETECTING RULE FILE
320 STATISTICAL ANALYSIS PROCESSING SECTION
330 DETERMINATION SECTION (EVENT PROCESSING SECTION)
331 ACTION DEFINITION FILE
340 LEARNING CONTROL UNIT
341 STATISTICAL ANALYSIS LEARNING SECTION
342 SUPPLEMENTARY INFORMATION LEARNING SECTION
351 FEEDBACK (FB) DATA STORAGE SECTION
400 SYSTEM COOPERATION SECTION
500 SYSTEM NODE

The invention claimed is:

1. A monitoring control system configured to detect one of phenomena each leading to a particular result based on at least one data piece received from a single or a plurality of data sources each serving as a data transmission element and to output action information to a predetermined system for the detected particular result, comprising:
    a phenomenon detecting section configured to detect the phenomenon leading to the particular result from contiguous time-series data pieces received from the data source based on detecting rule definition data previously specifying a change attribute of the contiguous time-series data pieces for each of the phenomena leading to the particular result, and
    a determination section configured to extract the action information associated with the particular result detected by the phenomenon detecting section to produce an event for the predetermined system based on action definition data previously specifying the action information for each of the particular results.

2. The monitoring control system according to claim 1, wherein the detecting rule definition data includes, as the change attribute, a predetermined chronological sequence of the contiguous time-series data pieces for each of the phenomena leading to the particular result, and
    the phenomenon detecting section is configured to match a chronological sequence of the contiguous time-series data pieces received from the data source with the predetermined sequence in the detecting rule definition data to detect the phenomenon leading to the particular result.

3. The monitoring control system according to claim 1, further comprising a statistical analysis processing section configured to perform statistical processing of the contiguous time-series data pieces received from the data source during a fixed time period to output a statistical result,
    wherein the detecting rule definition data includes, as the change attribute, a relationship between the statistical result and a threshold value for each of the phenomena leading to the particular result, and
    the phenomenon detecting section is configured to compare the statistical result output from the statistical analysis processing section with the threshold value to detect the phenomenon leading to the particular result.

4. The monitoring control system according to claim 3, further comprising:
    a storage section configured to store feedback information obtained from the predetermined system in response to the action information output to the predetermined system; and a statistical analysis learning section configured to calculate a learning value of a predetermined parameter for use in calculating the statistical analysis based on the feedback information.

5. The monitoring control system according to claim 1, further comprising:

a storage section configured to store feedback information obtained from the predetermined system in response to the action information output to the predetermined system; and a supplementary information learning section configured to change predetermined supplementary information based on the feedback information, the supplementary information being added to the action information and relating to the detected phenomenon.

6. A method of controlling a monitoring control system configured to detect one of phenomena each leading to a particular result based on at least one data piece received from a single or a plurality of data sources each serving as a data transmission element and to output action information to a predetermined system for the detected particular result, comprising the steps of:

detecting the phenomenon leading to the particular result from contiguous time-series data pieces received from the data source based on detecting rule definition data previously specifying a change attribute of the contiguous time-series data pieces for each of the phenomena leading to the particular result, and extracting the action information associated with the particular result detected by the step of the phenomenon detecting to produce an event for the predetermined system based on action definition data previously specifying the action information for each of the particular results.

7. The monitoring control system according to claim 2, further comprising a statistical analysis processing section configured to perform statistical processing of the contiguous time-series data pieces received from the data source during a fixed time period to output a statistical result, wherein the detecting rule definition data includes, as the change attribute, a relationship between the statistical result and a threshold value for each of the phenomena leading to the particular result, and the phenomenon detecting section is configured to compare the statistical result output from the statistical analysis processing section with the threshold value to detect the phenomenon leading to the particular result.

8. The method of controlling the monitoring control system according to claim 6, further comprising:

storing feedback information obtained from the predetermined system in response to the action information output to the predetermined system; and calculating a learning value of a predetermined parameter for use in calculating a statistical analysis based on the feedback information.

* * * * *